United States Patent [19]

Wang et al.

[11] Patent Number: 5,562,803
[45] Date of Patent: Oct. 8, 1996

[54] SEQUENTIAL BLEACHING OF DE-INKED PAPER PULP WITH SODIUM BISULFITE, DITHIONITE AND BOROHYDRIDE

[75] Inventors: David L. K. Wang, Hamburg, Germany; Patrick Meyers, Beringen, Belgium

[73] Assignee: Morton International, Inc., Chicago, Ill.

[21] Appl. No.: 341,851

[22] Filed: Nov. 18, 1994

Related U.S. Application Data

[63] Continuation of Ser. No. 80,027, Jun. 18, 1993, abandoned.

[30] Foreign Application Priority Data

Jun. 18, 1992 [GB] United Kingdom .................. 9212926

[51] Int. Cl.$^6$ .................. D21C 5/02; D21C 9/10
[52] U.S. Cl. .................. 162/5; 162/7; 162/8; 162/76; 162/80; 162/83; 162/84
[58] Field of Search .................. 162/80, 76, 83, 162/84, 78, 7, 8, 5

[56] References Cited

U.S. PATENT DOCUMENTS

| | | | |
|---|---|---|---|
| 3,284,283 | 11/1966 | Kindron et al. | |
| 4,198,266 | 4/1980 | Kirk et al. | 162/65 |
| 4,804,440 | 2/1989 | Liebergott et al. | 162/84 |
| 5,429,716 | 7/1995 | Haché et al. | 162/7 |
| 5,449,436 | 9/1995 | Bourson et al. | 162/7 |

FOREIGN PATENT DOCUMENTS

| | | | |
|---|---|---|---|
| 0191756 | 12/1986 | European Pat. Off. | 162/84 |
| 0374057 | 6/1990 | European Pat. Off. | |
| 1401122 | 7/1964 | France | |
| 1228136 | 11/1966 | Germany | 162/80 |
| 4115575A1 | 11/1992 | Germany | 162/83 |
| 51-36362 | 4/1974 | Japan | 162/7 |
| 6413774 | 5/1966 | Netherlands | 162/80 |

OTHER PUBLICATIONS

Munroe et al, "The SRP Process For High Brightness Mechanical Pulp"; pp. 1–6.
Singh, *The Bleaching of Pulp*, TAPPI Press; Atlanta, Ga. p. 149, 1979.
Database WPI, Section Ch, Week 7739, Derwent Publications Ltd., London, GB; Class E17, AN 77-70158Y & SU-A-536 271 (Perm Pulp Paper Ind) 4 Mar. 1977.

*Primary Examiner*—Steven Alvo
*Attorney, Agent, or Firm*—Charles N. Lovell; Gerald K. White

[57] ABSTRACT

Paper pulp, especially recycled paper pulp which has been deinked, is bleached in a synergistic two-stage process first with sodium bisulfite and then with sodium borohydride. The borohydride is preferably added in an aqueous mixture with sodium hydroxide. A weak acid such as acetic acid may be added to the pulp to advance further the brightness gain.

13 Claims, 5 Drawing Sheets

SEQUENTIAL BLEACHING OF DE-INKED PAPER PULP WITH SODIUM BISULFITE, DITHIONITE AND BOROHYDRIDE

This application is a continuation of application Ser. No. 08/080,027 filed Jun. 18, 1993, and now abandoned.

BACKGROUND OF THE INVENTION

1. Field of the Invention

This invention relates to method of bleaching paper pulp, especially recycled paper pulp which has been subjected to de-inking, to increase brightness and reduce the content of chromophores.

The process of de-inking paper pulp, for example recycled newsprint, involves the use of alkalis such as sodium hydroxide which tend to cause yellowing of the pulp. There is therefore a need for a subsequent bleaching

2. Description of the Prior Art

One type of reductive bleaching process for this purpose is disclosed in FR-A-2639371, according to which de-inked pulp is bleached by the combined action of:

a) sulphite ions derived from sodium sulphite, sodium bisulphite, a combination of the two or sulphur dioxide and sodium hydroxide and b) a reducing agent more electronegative than sulphite ions, for example thiourea dioxide, sodium borohydride or sodium dithionite.

Where sodium sulphite and/or bisulphite and sodium borohydride are used together, sodium dithionite is generated in situ to act as a reducing agent.

SUMMARY OF THE INVENTION

It has now been found that a surprising synergistic effect can be achieved, and the brightness gain increased, if bleaching is carried out in a two-stage process wherein the pulp is treated first with sodium bisulphite and subsequently with sodium borohydride.

In the process of the present invention, instead of bleaching being effected substantially wholly by sodium dithionite generated in situ, a first stage bleaching is effected by sodium bisulphite, and a second stage by sodium dithionite generated when the sodium borohydride is added and some of it reacts with residual bisulphite. A third bleaching stage is then effected by the unreacted sodium borohydride itself. The three stages between them give a total brightness gain greater than that achieved by adding the same reactants together.

In a preferred embodiment of the invention, the sodium borohydride is added in the form of an aqueous mixture with sodium hydroxide, preferably comprising 10 to 25 wt % $NaBH_4$ and 15 to 50 wt % NaOH. A particularly suitable mixture comprising 12% NaBH4, 40% NaOH and the 48% water, all by weight, is sold by Morton International, Inc under the trade mark BOROL. Another commercial solution comprises 20% each of $NaBH_4$ and NaOH.

The total concentration of bisulphite added is preferably in a range of 0.5 to 2.5 wt %, more preferably 1–2 wt %, based on oven dried pulp (ODP). An amount of 1.5 wt % has been found particularly suitable.

The total concentration of sodium borohydride added is typically 0.01 to 0.1% preferably in a range from 0.012 to 0.06 wt % which can be achieved by adding Borol solution, described above, in an amount of 0.1 to 0.5 wt %. More preferably, the sodium borohydride content is in a range from 0.024 to 0.048 wt %, corresponding to an addition of 0.2 to 0.4%, typically about 0.3 wt %, all based on ODP.

With certain types of pulp, notably those with a high wood fibre content such as recycled newsprint, a further brightness gain can be achieved by adding a small amount of a weak acid, preferably an organic acid such as acetic, formic, citric or oxalic acid. Preferably acetic acid is added in an amount of 0.1 to 0.2 wt %, preferably about 0.15 wt %, as glacial acid based on ODP.

The pulp is preferably at neutral or slightly acidic pH at the start of the process, preferably in the range ph 5–7. After treatment the pulp is preferably neutral or slightly alkaline.

The process of the invention has been found to yield substantial savings both in terms of time, since bleaching can be achieved in about 10 minutes, and in terms of cost and equipment since smaller amounts of expensive borohydride can be used to achieve a given brightness gain, and bleaching can be effected in transit through a pipe rather than in a special bleaching tower.

Further objects and advantages of the invention will now be apparent from the following examples when read with the references to the accompanying drawings which illustrate preferred embodiments of the invention.

DESCRIPTION OF THE PREFERRED EMBODIMENTS

EXAMPLE 1

Bleaching trials were carried out on samples of de-inked paper pulp from a French paper mill. The pulp samples had a consistency of 4–5% and a pH of 6.6–6.8. The pulp had been subjected to an oxidative de-inking process in which between 1.2 and 2.6% of hydrogen peroxide was added in the pulpers, but no residual peroxide could be found in the samples.

Samples containing 18g of oven dry pulp were weighed into plastic bottles with a screw cap. The bottles were preheated in a temperature bath at 45° C.

Each preheated bottle was removed from the bath and a 37% commercial solution of sodium bisulphite was added to give a bisulphite content of 1.5 wt. % based on ODP. After a five minute interval a 10% Borol solution, obtained by diluting with deionized water, was added in varying amounts. The samples were shaken thoroughly after each addition and returned to the temperature bath. Bleaching was allowed to continue for 60 minutes at 45° C. after which the samples were withdrawn from the temperature bath, tested for final pH and diluted to a consistency of about 1% with tap water. Handsheets from each sample were prepared on a Buchner filter, their pH being adjusted to pH5 with 0.1N sulphuric acid, and dried in a microwave oven. The optical properties of the sheets were measured on an Elrepho 2000 machine.

The results are shown in Table 1, in which sample Nos. 110 and 111 are reference samples using no Borol. the amounts of Borol used, from 0.1 to 0.6 wt. % on ODP, correspond to 0.012 to 0.072 wt. % on ODP of sodium borohydride.

TABLE 1

|      | NR  | pH START | pH AFTER | % BISULF | % BOROL | ISO   | Delta ISO | DdJ   | DN     | PE   |
|------|-----|----------|----------|----------|---------|-------|-----------|-------|--------|------|
| Ref. | 110 | 6.66     | 6.55     | 0        | 0       | 62.23 | 0         | 15.09 | 574.09 | 8.01 |
| Ref. | 111 | 6.66     | 6.63     | 1.5      | 0       | 62.96 | 0.73      | 14.8  | 573.42 | 7.87 |
|      | 112 | 6.66     | 8.23     | 1.5      | 0.1     | 66.08 | 3.85      | 12.71 | 572.57 | 6.76 |
|      | 113 | 6.66     | 8.97     | 1.5      | 0.15    | 65.73 | 3.5       | 12.73 | 572.81 | 6.75 |
|      | 114 | 6.66     | 9.3      | 1.5      | 0.2     | 66.27 | 4.04      | 12.47 | 572.56 | 6.64 |
|      | 115 | 6.66     | 9.47     | 1.5      | 0.25    | 67.04 | 4.81      | 11.96 | 572.27 | 6.38 |
|      | 116 | 6.66     | 9.75     | 1.5      | 0.3     | 66.73 | 4.5       | 12.19 | 572.34 | 6.46 |
|      | 117 | 6.66     | 9.85     | 1.5      | 0.35    | 66.63 | 4.4       | 11.89 | 572.62 | 6.32 |
|      | 118 | 6.66     | 10.1     | 1.5      | 0.4     | 66.85 | 4.62      | 11.67 | 571.94 | 6.22 |
|      | 119 | 6.66     | 10.0     | 1.5      | 0.5     | 66.04 | 3.81      | 11.71 | 572.12 | 6.22 |
|      | 120 | 6.66     | 10.7     | 1.5      | 0.6     | 65.62 | 3.39      | 11.99 | 572.4  | 6.36 |

Figure 1:
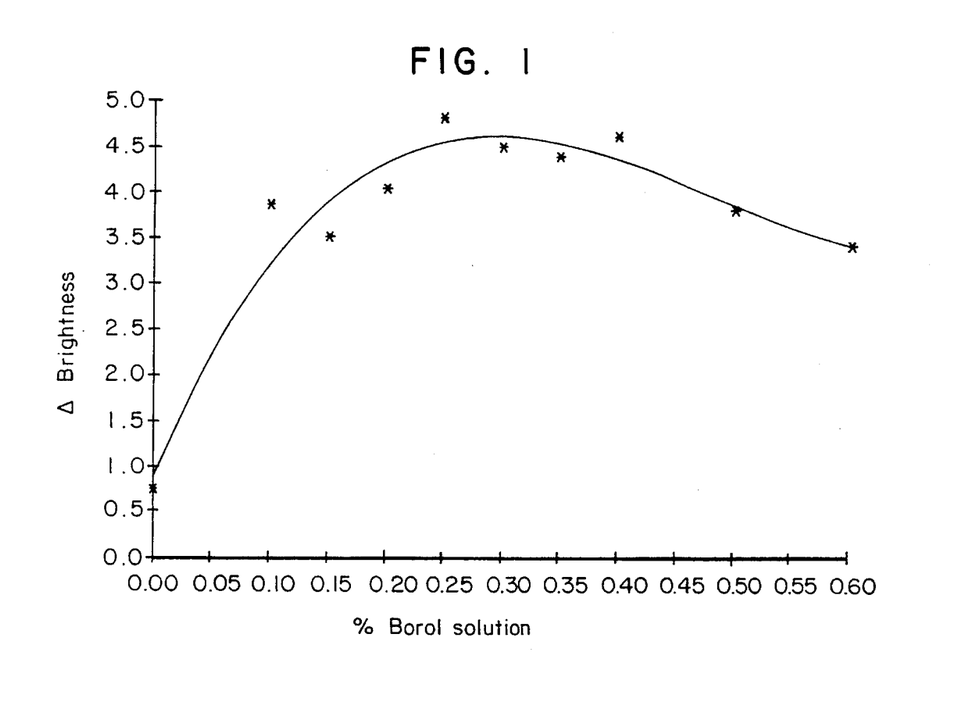
FIG. 1 is a graph showing how brightness gain varies with Borol concentration for a fixed bisulphite concentration.

FIG. 1 of the drawings shows how the brightness gain obtained in the bleaching process varies with the Borol content, for a fixed bisulphite content. Sodium bisulphite alone gives an ISO brightness gain of less than 1 point, whereas with 0.1% of Borol added subsequently a gain of over 3 points is obtained and the maximum gain is obtained with a Borol addition of 0.25%, corresponding to 0.03 wt. % of $NaBH_4$, a far lower concentration than has been used previously.

EXAMPLE 2

The process of Example 1 was repeated using similar pulp samples, but using a constant Borol content of 0.35 wt. % (0.042 wt. % $NaBH_4$) and varying the bisulphite concentration between 0 and 1.75 wt. % on ODP. The optical properties of the resulting handsheets are set out in Table 2, in which samples 211 and 212 are reference samples using no bisulphite.

TABLE 2

|      | NR  | pH START | pH AFTER | % BISULF | % BOROL | ISO   | Delta ISO | DdJ   | DN     | PE   |
|------|-----|----------|----------|----------|---------|-------|-----------|-------|--------|------|
| Ref. | 211 | 6.66     | 6.8      | 0        | 0       | 62.23 | 0         | 11.76 | 578.25 | 5.88 |
| Ref. | 212 | 6.66     | 10.51    | 0        | 0.35    | 63.38 | 1.15      | 9.23  | 578.26 | 4.54 |
|      | 213 | 6.66     | 10.19    | 0.25     | 0.35    | 63.41 | 1.18      | 9.3   | 578.15 | 4.6  |
|      | 214 | 6.66     | 10.14    | 0.5      | 0.35    | 64.91 | 2.68      | 8.59  | 577.67 | 4.25 |
|      | 215 | 6.66     | 10.14    | 0.75     | 0.35    | 65.24 | 3.01      | 9.1   | 578.27 | 4.64 |
|      | 216 | 6.66     | 9.98     | 1        | 0.35    | 65.69 | 3.46      | 8.47  | 578.66 | 4.07 |
|      | 217 | 6.66     | 9.96     | 1.25     | 0.35    | 66.26 | 4.03      | 8.31  | 577.7  | 4.12 |
|      | 218 | 6.66     | 9.93     | 1.5      | 0.35    | 65.53 | 3.3       | 8.12  | 578.18 | 3.96 |
|      | 219 | 6.66     | 9.79     | 1.75     | 0.35    | 65.19 | 2.96      | 8.65  | 577.3  | 4.28 |
|      | 220 | 6.66     | 9.78     | 2        | 0.35    | 65.31 | 3.08      | 8.53  | 576.75 | 4.29 |

Figure 2:
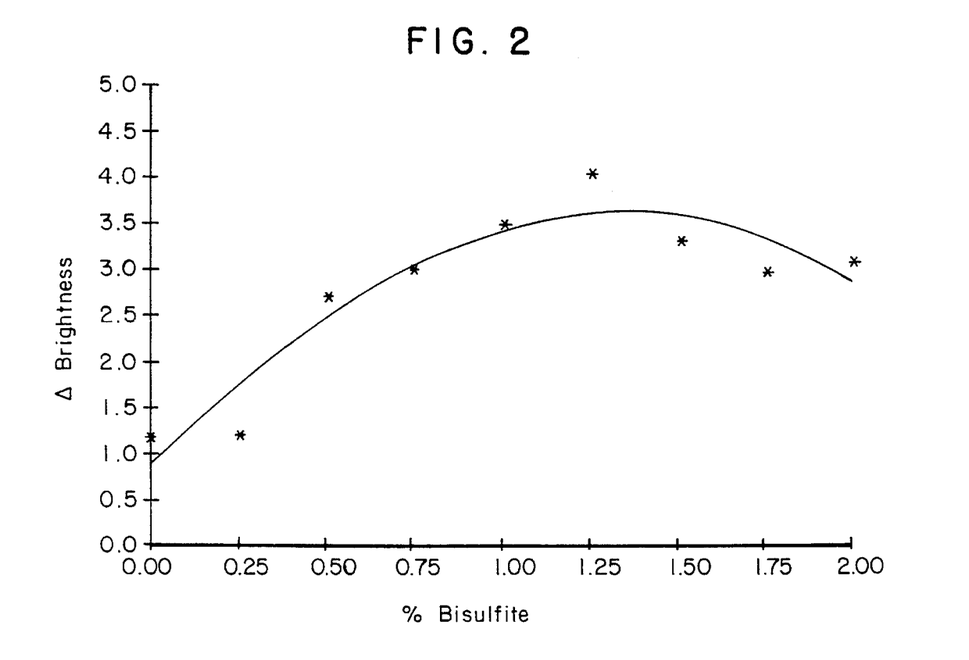
FIG. 2 is a graph showing how the brightness gain varies with bisulphite concentration for a given Borol concentration.

FIG. 2 of the drawing shows how the brightness gain varies with the bisulphite concentration. This shows that the use of Borol alone gives a brightness gain of Just over 1 point, and that the optimum addition is from 1 to 1.5 wt. % of bisulphite.

EXAMPLE 3

Figure 3:
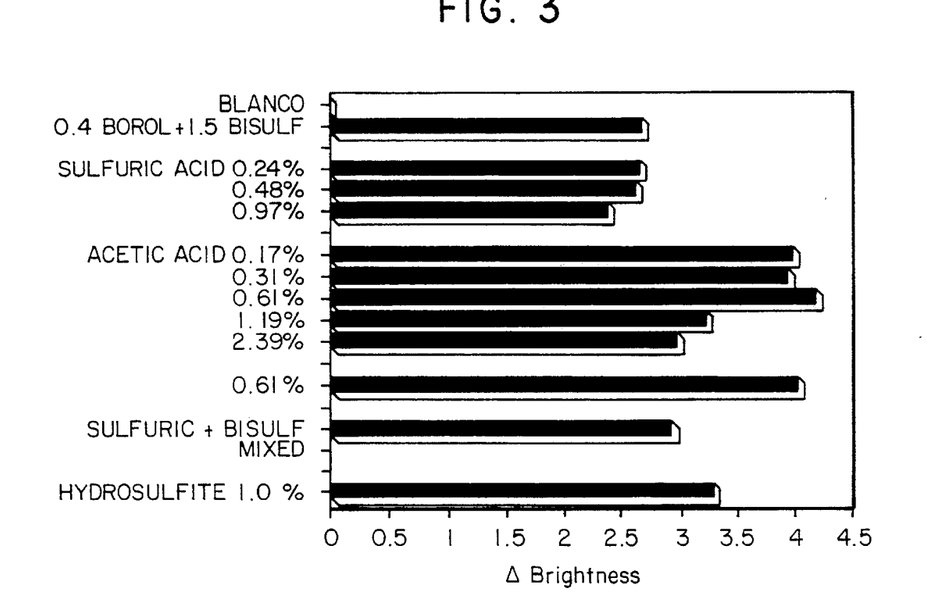
FIG. 3 is a bar chart comparing the brightness gain with various combinations of bleaching chemicals.

The process of Example 1 was repeated but using constant amounts of Borol (0.35 wt. %) as well as sodium bisulphite (1.5 wt. %) and adding an acid to the pulp mixture, usually after the bisulphite and before the Borol, again with 5 minute intervals between additions. The results are shown in Table 3, and illustrated by a bar chart in FIG. 3 of the drawings.

In Table 3, sample 301 is a reference sample, and sample 302 uses no acid. Samples 303 to 305 show that sulphuric acid makes no significant different to the ISO brightness gain, while in samples 306 to 311 the addition of a small quantity of acetic acid gives an average additional brightness gain of about one point. The highest gain was obtained with an addition of 0.61 wt. % of acetic acid in sample 308. The order of addition in samples 306 to 310 was bisulphite-acid-Borol, but in sample 311 the acid was added first. The result was not significantly different from that obtained in sample 308.

In sample 312, 0.33 wt. % of $H_2SO_4$ was mixed with the bisulphite, and again did not significantly affect the brightness gain.

For comparison, sample 313 was bleached with 1% sodium hydrosulphite.

TABLE 3

| NR | pH START | pH AFTER | % BISULF | % BOROL | % ACID | ISO | Delta ISO | DdJ | DN | PE |
|---|---|---|---|---|---|---|---|---|---|---|
| Ref. 301 | 6.66 | 6.84 | 0 | 0 | 0 | 61.56 | 0 | 10.47 | 576.73 | 5.15 |
| 302 | 6.66 | 10.23 | 1.5 | 0.35 | 0 | 64.54 | 2.98 | 7.38 | 577.38 | 3.63 |
| SULFURIC ACID | | | | | | | | | | |
| 303 | 6.66 | 10.03 | 1.5 | 0.35 | 0.24 | 64.52 | 2.96 | 7.65 | 576.94 | 3.79 |
| 304 | 6.66 | 9.85 | 1.5 | 0.35 | 0.48 | 64.49 | 2.93 | 7.93 | 576.4 | 3.92 |
| 305 | 6.66 | 9.17 | 1.5 | 0.35 | 0.97 | 64.26 | 2.7 | 7.82 | 576.49 | 3.87 |
| ACETIC ACID | | | | | | | | | | |
| 306 | 6.66 | 10.05 | 1.5 | 0.35 | 0.17 | 65.53 | 3.98 | 7.32 | 577.07 | 3.58 |
| 307 | 6.66 | 9.97 | 1.5 | 0.35 | 0.31 | 65.49 | 3.94 | 7.24 | 576.71 | 3.77 |
| 308 | 6.66 | 9.92 | 1.5 | 0.35 | 0.61 | 65.88 | 4.35 | 7.57 | 576.83 | 3.77 |
| 309 | 6.66 | 9.88 | 1.5 | 0.35 | 1.19 | 65.08 | 3.52 | 7.63 | 576.35 | 3.8 |
| 310 | 6.66 | 8.94 | 1.5 | 0.35 | 2.39 | 64.82 | 3.26 | 7.95 | 576 | 4 |
| 311 | 6.66 | 10.05 | 1.5 | 0.35 | 0.61 | 65.57 | 4.32 | 7.21 | 577.06 | 3.55 |
| SULFURIC ACID MIXED IN BISULFITE | | | | | | | | | | |
| 312 | 6.66 | 10.08 | 1.5 | 0.35 | 0.33 | 64.02 | 2.92 | 8.27 | 577.96 | 4.06 |
| 1% HYDROSULFITE | | | | | | | | | | |
| Ref. 313 | 6.8 | 6.76 | 0 | 0 | 0 | 65.53 | 3.3 | 10 | 577.14 | 4.95 |

EXAMPLE 4

Bleaching trials were carried out on samples of thermoground wood (TGW) pulp from a hydrosulphite bleach tower at a pulp mill in Germany. Experience has shown that because of inferior wood quality during the summer months the initial ISO brightness of unbleached TGW pulp is 2 to 3 points lower than during the rest of the year. The target brightness can thus not be achieved by hydrosulphite bleaching alone. Even if the addition rate of hydrosulphite powder is increased, the brightness gain is still 2 to 3 points short of the target and therefore brighter and more expensive kaolin has to be added to the pulp. More specifically, post-bleaching with 0.2–0.3% $Na_2S_2O_4$ could achieve a brightness gain of 0.9 points, but further increasing the addition rate shows no positive effect on the brightness response and increases the likelihood of corrosion problems. Trials were therefore carried out to assess the effect of post-bleaching with Borol solution in combination with bisulphite and/or acetic acid.

10 g samples of oven dried bleached TGW pulp samples at a consistency of 4.5% were weighed in plastic bags and pre-heated in a water bath to 65° C. Each bag was then removed from the heated bath and a 5% solution of sodium bisulphite in deionized water was added. The sample was shaken thoroughly to achieve homogeneous mixing and after a 2 minute interval a 1% solution of Borol in deionized water was added.

The bags were returned to the 65° C. water bath and the post-bleaching was allowed to continue for 60 minutes. After this period the bags were withdrawn from the bath, measured for pH and diluted to 1% with deionized water. Handsheets were prepared on a Buchner filter and dried with a rapid handsheet builder. Their optical properties were measured using Hunter brightness equipment.

Table 4 shows the amounts of bleaching agents added to each sample, together with the measured pH and the brightness gains achieved.

TABLE 4

| N* | $NaHSO_3$ %/adp | BOROL %/adp | pH Initial | pH Final | BRIGHTNESS % ISO | Δ-BRIGHTNESS % ISO |
|---|---|---|---|---|---|---|
| 405 Ref | — | — | 5.10 | 5.03 | 69.22 | — |
| 406 Ref | 1 | — | 5.01 | 4.80 | 69.86 | 0.64 |
| 407 | 1 | 0.1 | 5.16 | 5.04 | 70.76 | 1.54 |
| 408 | 1 | 0.2 | 5.35 | 5.09 | 69.95 | 0.73 |
| 409 | 1 | 0.3 | 5.68 | 5.37 | 70.65 | 1.43 |
| 410 | 1 | 0.4 | 5.98 | 5.80 | 70.75* | 1.53 |
| 411 | 1 | 0.5 | 6.13 | 5.62 | 69.88* | 0.66 |
| 412 Ref | — | 0.2 | 5.67 | 5.42 | 70.00* | 0.78 |
| 413 Ref | — | 0.3 | 6.00 | 5.64 | 69.17* | −0.05 |
| 414 Ref | — | 0.5 | 6.98 | 6.62 | 68.82* | −0.40 |
| 416 Ref | — | — | 5.08 | 5.02 | 69.08 | — |
| 417 Ref | 1.5 | — | 5.02 | 4.80 | 70.08 | 1.00 |
| 418 | 1.5 | 0.1 | 5.19 | 5.02 | 70.73 | 1.65 |
| 419 | 1.5 | 0.2 | 5.52 | 5.23 | 70.79 | 1.71 |
| 420 | 1.5 | 0.3 | 5.80 | 5.33 | 70.47 | 1.39 |
| 421 Ref | 2.0 | — | 4.98 | 4.72 | 70.16 | 1.06 |
| 422 | 2.0 | 0.1 | 5.14 | 4.92 | 70.54 | 1.46 |

TABLE 4-continued

| N* | NaHSO$_3$ %/adp | BOROL %/adp | pH Initial | pH Final | BRIGHTNESS % ISO | Δ-BRIGHTNESS % ISO |
|---|---|---|---|---|---|---|
| 423 | 2.0 | 0.2 | 5.65 | 5.29 | 70.44 | 1.36 |
| 424 | 2.0 | 0.3 | 5.78 | 5.51 | 70.35 | 1.27 |
| 425 Ref | — | — | 5.21 | 5.12 | 69.62 | — |
| 426 Ref | 0.5 | — | 4.81 | 4.76 | 69.86 | 0.24 |
| 427 | 0.5 | 0.1 | 5.18 | 5.17 | 70.53 | 0.91 |
| 428 | 0.5 | 0.2 | 5.31 | 5.28 | 70.52 | 0.90 |
| 429 | 0.5 | 0.3 | 5.52 | 5.35 | 70.47 | 0.85 |

In samples 410 to 414 the pH of the pulp was adjusted to 5 with 1N H$_2$SO$_4$ when it was made into handsheets.

Figure 4:
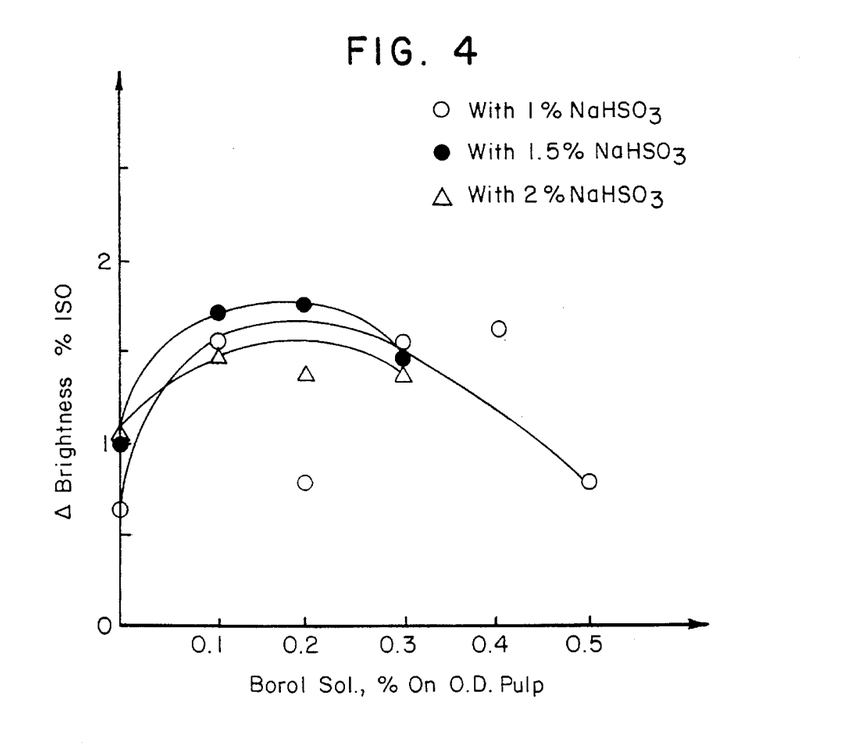
FIG. 4 shows how brightness gain varies with Borol concentration for three different bisulphite addition levels.

FIG. 4 of the drawings shows how the brightness gain varies with the Borol concentration for three different addition levels of sodium bisulphite. This shows an optimum addition level of Borol of 0.1–0.3 wt. % on ODP, corresponding to 0.012 to 0.036 wt. % of NaBH$_4$. No further gain is obtained by going above the 0.3% level, and indeed this may cause brightness reversion owing to the high alkalinity of Borol.

The largest brightness gain was 1.71 ISO points, obtained with sample 419 to which 0.2% of Borol (corresponding to 0.024 wt. % of NaBH$_4$ on ODP) and 1.5 wt. % of bisulphite were added.

EXAMPLE 5

The process of Example 4 was repeated but adding varying amounts of acetic acid as a 1% solution in deionized water, after the bisulphite and before the Borol, again with 2 minute intervals between additions. The addition levels, brightness gains and measured pH values are shown in Table 5.

EXAMPLE 6

Bleaching tests were carried out on de-inked paper pulp, having a low wood fibre content, from a paper mill in Denmark. Pulp samples containing 42.5 g of oven dry pulp were placed in 1000 ml plastic containers and diluted to 5% consistency with distilled water. Before each trial the samples were preheated to 50° C. in a constant temperature bath.

The preheated containers were removed from the bath and a 4.25 wt. % solution of sodium bisulphite was added, followed by a 2% Borol solution. In some of the tests, acetic acid was added after the bisulphite and before the Borol.

After a bleaching period of 60 minutes the containers were withdrawn from the bath, measured for final pH and diluted to ±1% consistency with tap water. Handsheets were prepared on a Buchner filter and their optical properties were measured on an Elrepho 2000 machine. The results are shown in Table 6.

TABLE 5

| N* | NaHSO$_3$ %/adp | HOAc %/adp | BOROL %/adp | pH Initial | pH Final | BRIGHTNESS % ISO | Δ-BRIGHTNESS % ISO |
|---|---|---|---|---|---|---|---|
| 530 Ref | — | — | — | 5.21 | 5.12 | 69.62 | — |
| 531 | 0.5 | 0.10 | 0.1 | 4.90 | 4.89 | 70.02 | 0.40 |
| 532 | 0.5 | 0.15 | 0.1 | 4.85 | 4.86 | 70.73 | 1.11 |
| 533 | 1.0 | 0.10 | 0.1 | 4.92 | 4.92 | 70.63 | 0.41 |
| 534 | 1.0 | 0.15 | 0.1 | 4.85 | 4.85 | 71.28 | 1.66 |
| 535 | 1.5 | 0.15 | 0.1 | 4.78 | 4.80 | 71.89 | 2.27 |
| 536 | 1.5 | 0.15 | 0.2 | 4.95 | 4.88 | 70.29 | 0.67 |
| 537 | 2.0 | 0.15 | 0.1 | 4.68 | 4.83 | 71.59 | 1.97 |
| 538 | 2.0 | 0.20 | 0.1 | 4.66 | 4.73 | 71.19 | 1.57 |
| 539 | 2.0 | 0.15 | 0.2 | 4.94 | 4.85 | 70.99 | 1.37 |
| 540 | 2.0 | 0.20 | 0.2 | 4.88 | 4.87 | 71.59 | 1.97 |

Figure 5:
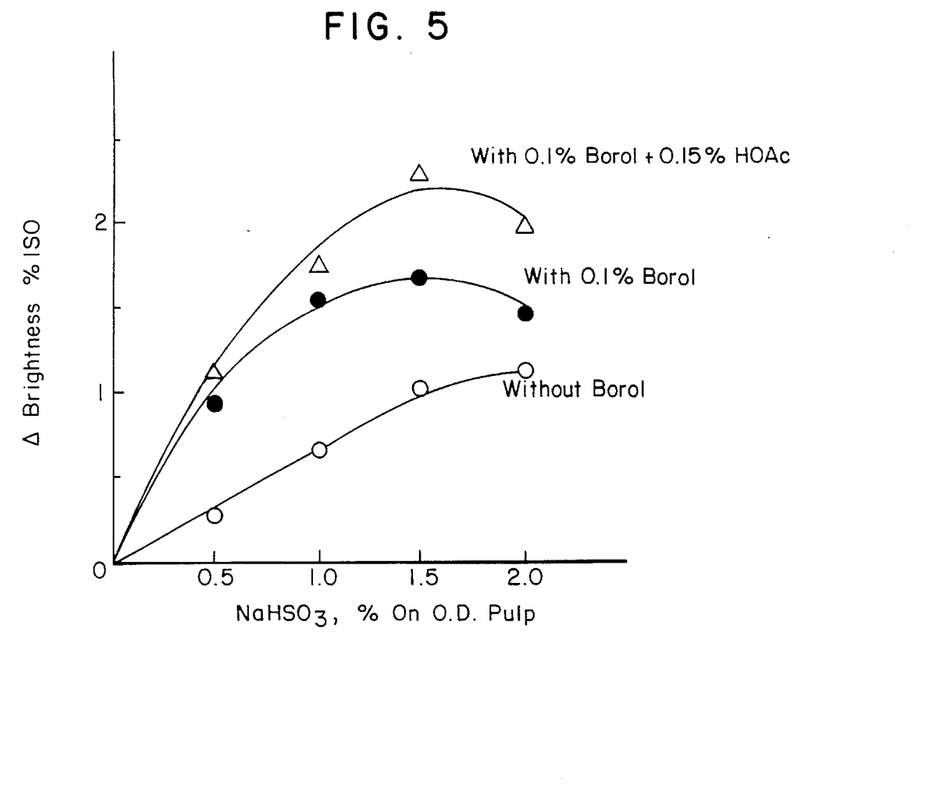
FIG. 5 shows how brightness gain varies with bisulphite concentration with or without Borol and/or acetic acid.

FIG. 5 of the drawing shows how the brightness response varies with the bisulphite concentration, with and without Borol and/or acetic acid. The optimum addition level of bisulphite is found to be in the range from 1–2 wt. % on ODP, preferably about 1.5%. There is found to be little benefit in going above the 2% level.

The highest brightness gain of 2.27 ISO points was obtained with sample 535, which used a Borol addition level of only 0.1%. This is particularly advantageous in view of the high price of sodium borohydride relative to that of the other bleaching agents.

The optimum addition level for acetic acid was found to be 0.15 wt. % on ODP.

TABLE 6

| NR | pH START | pH AFTER | % Borol | % Bisul | % HOAc | ISO | Δ ISO | Y | Δ Y | L | a | b |
|---|---|---|---|---|---|---|---|---|---|---|---|---|
| Ref 609 | 7.1 | 6.96 | 0 | 0 | 0 | 67 | 0 | 72.21 | 0 | 87.92 | 0.4 | 4.8 |
| Ref 610 | 6.5 | 6.68 | 0 | 1.5 | 0 | 68.1 | 1.1 | 72.93 | 0.72 | 88.28 | 0.4 | 4.4 |
| 611 | 6.74 | 6.78 | 0.1 | 1.5 | 0 | 71.75 | 4.75 | 75.52 | 3.31 | 89.55 | −0.2 | 3.6 |
| 612 | 6.74 | 6.89 | 0.2 | 1.5 | 0 | 73.1 | 6.1 | 76.46 | 4.25 | 89.98 | −0.2 | 3.2 |
| 613 | 7.05 | 7.02 | 0.3 | 1.5 | 0 | 73.48 | 6.48 | 77.08 | 4.87 | 90.24 | −0.2 | 3.3 |
| 614 | 7.05 | 7.14 | 0.4 | 1.5 | 0 | 73.07 | 6.07 | 76.27 | 4.06 | 89.91 | −0.2 | 3.1 |
| 615 | 7.2 | 7.26 | 0.5 | 1.5 | 0 | 73.48 | 6.48 | 76.51 | 4.3 | 90.06 | −0.2 | 3 |
| Ref 616 | 7.67 | 7.72 | 0.3 | 0 | 0 | 68.46 | 1.46 | 73.06 | 0.85 | 88.33 | 0.5 | 4.1 |
| Ref 617 | 7.15 | 6.84 | 0 | 0 | 0 | 67.69 | 0 | 72.8 | 0 | 88.23 | 0.7 | 4.4 |
| Ref 618 | 6.34 | 6.62 | 0 | 1.5 | 0.15 | 67.89 | 0.2 | 72.36 | −0.44 | 87.99 | 0.4 | 4.1 |
| 619 | 6.57 | 6.7 | 0.1 | 1.5 | 0.15 | 71.97 | 4.28 | 75.84 | 3.04 | 89.71 | −0.2 | 3.7 |
| 620 | 6.71 | 6.79 | 0.2 | 1.5 | 0.15 | 72 | 4.31 | 75.8 | 3 | 89.76 | −0.2 | 3.7 |
| 621 | 6.81 | 6.91 | 0.3 | 1.5 | 0.15 | 73.56 | 5.87 | 76.8 | 4 | 90.16 | −0.2 | 3 |
| 622 | 7 | 7.1 | 0.4 | 1.5 | 0.15 | 72.77 | 5.08 | 76.19 | 3.39 | 89.86 | −0.2 | 3.2 |
| 623 | 7.18 | 7.06 | 0.5 | 1.5 | 0.15 | 72.74 | 5.05 | 76.41 | 3.61 | 89.94 | −0.2 | 3.4 |
| Ref 624 | 7.5 | 7.18 | 0.3 | 0 | 0.15 | 68.96 | 1.27 | 73.86 | 1.06 | 88.73 | 0.4 | 4.4 |

Figure 6:
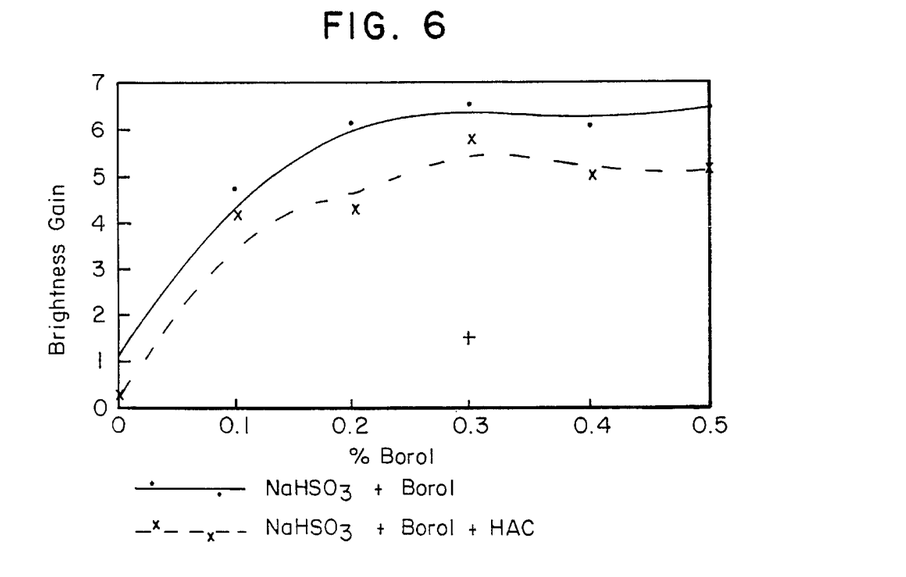
FIG. 6 shows the brightness gains achieved with and without acetic acid in pulp having a low wood content.

The variation in brightness gain with Borol concentration is shown in FIG. 6, from which it can be seen that in this instance no benefit derives from the use of acetic acid. This is thought to be because of the low percentage of wood-containing waste in the pulp furnish.

It can also be seen that in this example the highest brightness gains were with samples 613 and 615, in which the Borol content was 0.3 and 0.5 wt. % respectively. Nonetheless, the optimum range for the Borol content is 0.2 to 0.4 wt. %, corresponding to 0.024 to 0.048 wt. % $NaBH_4$ on ODP, particularly in view of the high cost of sodium borohydride. Above this range the general trend in brightness gain is downwards.

EXAMPLE 7

The pulp from the same mill as in Example 6 having hitherto been bleached using formamidine sulphinic acid (FAS), the direct Borol injection (DBI) process of Example 6 was compared with an FAS bleaching process using a 5% FAS solution containing 2.5% sodium hydroxide. A preliminary test showed that the highest brightness gain using FAS was obtained with an FAS concentration of 0.6 wt. % on ODP.

Four samples were treated, using conditions similar to those of Example 6 except that the bleaching temperature was 65° C. Sample 740 was treated with FAS at 0.6% concentration on ODP. Sample 741 was subjected to a DBI process using the optimum quantities determined by Example 6. Sample 742 was subjected to a two-stage (YY) bleach using FAS followed by DBI and sample 743 was subjected to a YY bleach, first by DBI and then with FAS at half concentration. The results are shown in Table 7.

TABLE 7

| NR | pH START | pH AFTER | % FAS | % Bisul | % Borol | Δ ISO | Δ Y |
|---|---|---|---|---|---|---|---|
| 740 | 7.99 | 7.18 | 0.6 | 0 | 0 | 6.62 | 5.06 |
| 741 | 7.05 | 7.02 | 0 | 1.5 | 0.3 | 6.48 | 4.87 |
| 742 | 7.05 | 7.02 | 0.6 | 1.5 | 0.3 | 5.73 | 5.09 |
| 743 | 7.01 | 7 | 0.3 | 1.5 | 0.3 | 5.54 | 4.95 |

This example demonstrates that the DBI process of the present invention can deliver a brightness gain to match that obtained using FAS, with a cost saving of up to 50% or more in view of the high cost of FAS.

EXAMPLE 8

Further samples were bleached using the procedure and conditions of Example 7, to compare and combine a DBI process using 1.5% sodium bisulphite and 0.25% Borol with an oxidative bleaching process using hydrogen peroxide, sodium hydroxide and diethylenetriamine pentacetic acid (DTPA). The required volumes of $H_2O_2$, NaOH and DTPA were pipetted into a small beaker and diluted with 10 ml of distilled water. The beaker was rinsed with water to ensure that all the chemicals were added to the pulp. The bleaching time with peroxide was 120 minutes. The pH of pulp samples bleached with peroxide was adjusted at the end of the bleaching period to 7 by adding sodium bisulphite.

The results are shown in Table 8. Samples 825 and 826 were bleached with the peroxide mixture alone and sample 827 by DBI alone. Samples 828 to 831 were subjected to a two stage (YP) process comprising a DBI bleach followed by a peroxide bleach. Samples 832 and 833 were subjected to a 3-stage (YPY) process wherein the peroxide bleach was followed by a further DBI bleach with 1.0% bisulphite and 0.2% Borol. Y-stage here means using the DBI process.

Figure 7:
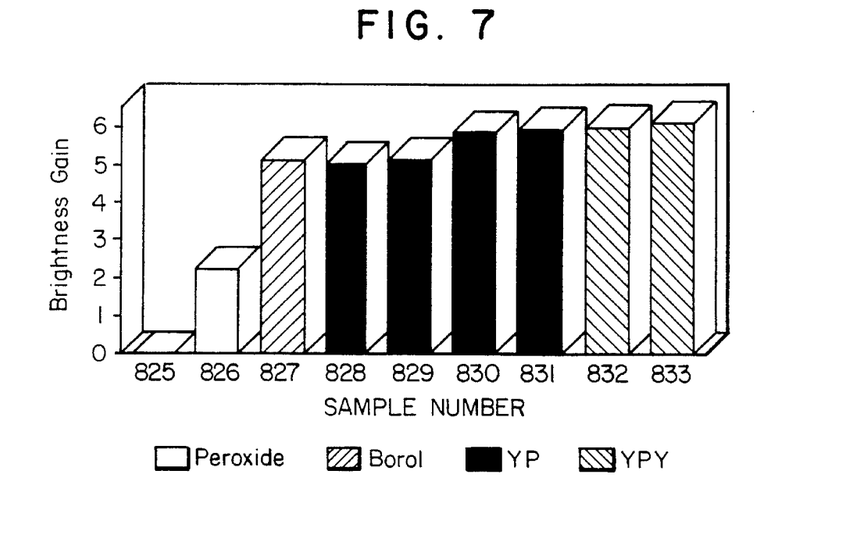
FIG. 7 is a bar chart showing the brightness gain achieved with the direct Borol injection (DBI) process of the present invention, on its own and in combination with other bleaching steps.

The results are shown in Table 8 and illustrated in the bar chart of FIG. 7. Although the YPY treatments gave the highest brightness gains, the improvement over the DBI process on its own was marginal and the aditional cost of the use of peroxide in combination with DBI would not be justified by this marginal brightness response. The DBI treatment gave a much larger brightness gain than the peroxide process alone.

TABLE 8

| NR | pH Init. | pH Mid. | pH Fin. | % Bisul 1 | % Borol 1 | % NaOH | % DTPA | % H2O2 | % Bisulfi 2 | % Borol 2 | ISO | Δ ISO | Y | Δ Y | L | a | b |
|---|---|---|---|---|---|---|---|---|---|---|---|---|---|---|---|---|---|
| Ref 836 | 7.05 | — | 6.75 | 0 | 0 | 0 | 0 | 0 | 0 | 0 | 65.91 | 0 | 72.41 | 0 | 88.04 | 0.2 | 5 |
| Ref 825 | 10.3 | — | 9.58 | 0 | 0 | 0.35 | 0.3 | 0.5 | 0 | 0 | 65.92 | 0.01 | 71.93 | −0.48 | 87.79 | 0.6 | 5 |
| Ref 826 | 10.4 | — | 10.16 | 0 | 0 | 0.75 | 0.3 | 1 | 0 | 0 | 68.13 | 2.22 | 74.45 | 2.04 | 88.96 | 0.3 | 5 |
| 827 | 6.9 | — | 6.87 | 1.5 | 0.25 | 0 | 0 | 0 | 0 | 0 | 71.04 | 5.13 | 75.8 | 3.39 | 89.69 | −0.2 | 4 |
| 828 | 6.9 | 8.6 | 8 | 1.5 | 0.25 | 0.25 | 0.3 | 0.25 | 0 | 0 | 70.9 | 4.99 | 75.47 | 3.06 | 89.53 | −0.1 | 4 |
| 829 | 6.9 | 9.4 | 8.26 | 1.5 | 0.25 | 0.5 | 0.3 | 0.5 | 0 | 0 | 71 | 5.09 | 75.65 | 3.24 | 89.57 | 0.1 | 4 |
| 830 | 6.9 | 10.3 | 7.94 | 1.5 | 0.25 | 0.75 | 0.3 | 0.75 | 0 | 0 | 71.7 | 5.79 | 76.24 | 3.83 | 89.84 | 0.1 | 4 |
| 831 | 6.9 | 10.47 | 9.3 | 1.5 | 0.25 | 1 | 0.3 | 1 | 0 | 0 | 71.8 | 5.89 | 76.45 | 4.04 | 89.94 | 0.1 | 4 |
| 832 | 8 | — | 7.22 | 1.5 | 0.25 | 0.25 | 0.3 | 0.25 | 1 | 0.2 | 71.86 | 5.95 | 76.47 | 4.06 | 90 | 0.1 | 4 |
| 833 | 8.26 | — | 7.2 | 1.5 | 0.25 | 0.5 | 0.3 | 0.5 | 1 | 0.2 | 71.99 | 6.08 | 76.52 | 4.11 | 90.05 | −0.1 | 4 |

Reversion

All the samples of the peroxide, YP and YPY trials of Example 7 were aged in the temperature bath at 65° C. for 24 hours, and the brightness was measured to check whether reversion had occurred.

Table 9 shows that the brightness of all samples, obtained by whatever bleaching method, was very stable and even better after long term storage. This gives the assurance that the obtained brightness will be stable if the production is stopped for a longer period by unexpected circumstances.

TABLE 9

| Sample Number | ISO brightness Initial | ISO brightness After ageing | Reversion |
|---|---|---|---|
| 834 Blank | 65.9 | 66.36 | −0.45 |
| 825 P | 65.9 | 68.51 | −2.59 |
| 826 P | 68.1 | 68.40 | −0.27 |
| 829 YP | 71.0 | 73.34 | −2.34 |
| 830 YP | 71.7 | 71.98 | −0.28 |
| 831 YP | 71.8 | 71.90 | −0.10 |
| 832 YPY | 71.8 | 72.55 | −0.69 |
| 833 YPY | 71.9 | 73.34 | −1.35 |

EXAMPLE 9

Bleaching trials were carried on three different types of de-inked paper pulp from a German paper mill different from that of Example 4. These are designated in the following as DIP 1, 2 and 3:

1. DIP 1 : ONP, 2 step flotation de-inking, initial brightness 64.4% ISO
2. DIP 2 : ONP, 2 step flotation de-inking, initial brightness 59.5% ISO
3. DIP 3 : Wood-free office waste paper, 1 step flotation de-inking, initial brightness 70.6% ISO.

Pulp samples containing 10 grams of oven dry pulp were placed in 1 l plastic bags. The consistency of the pulp was brought down to 5% with hot tap water to give a temperature of 65° C. The bleaching chemicals used were a 4.5% bisulphite solution, 2% Borol solution and 1.5% HOAc solution. The bisulphite was pipetted firstly into the pulp before the Borol solution was added. In the runs with acetic acid, the HOAc solution was added between the addition of the bisulphite and the Borol solution.

The initial pH of each sample was measured shortly after adding chemicals, then the sample bag was put into the temperature bath at 65° C. The retention time was 60 minutes for all the trials. At the end of the bleaching period, the final pH was measured again.

The pulp sample was diluted to 1 l with tap water. 200 ml of the sample were diluted to 2 l again. 180 ml were taken for preparation of a handsheet.

Optical properties of both sides of the handsheet were measured according to the mill's laboratory procedure on a Data Color 2000 machine. The average values of the optical properties of each sample were calculated and used for the bleaching effect comparison.

Figure 8:
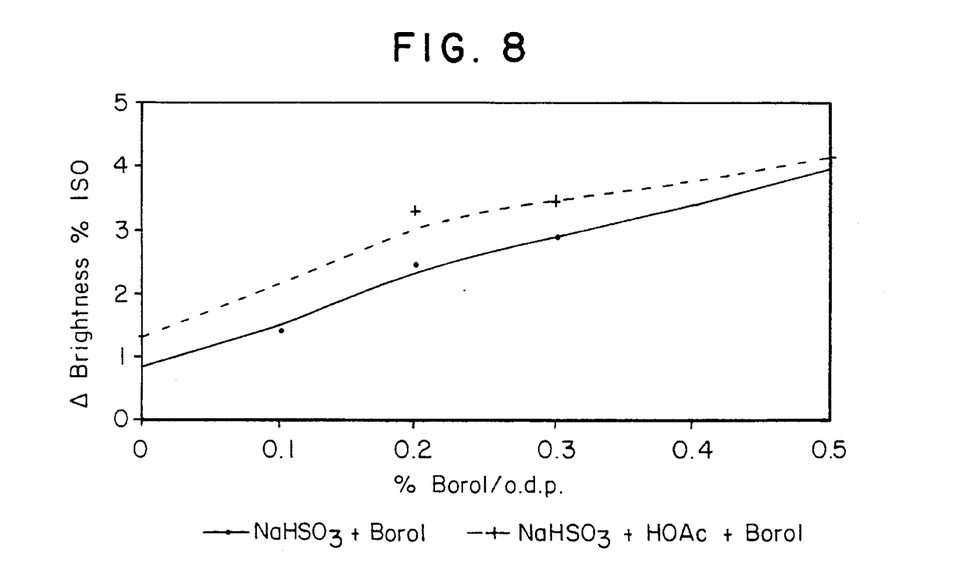
FIGS. 8, 9 and 10 show, for three different pulp samples, the brightness gains achieved with different addition levels of Borol with and without acetic acid.
Figure 9:
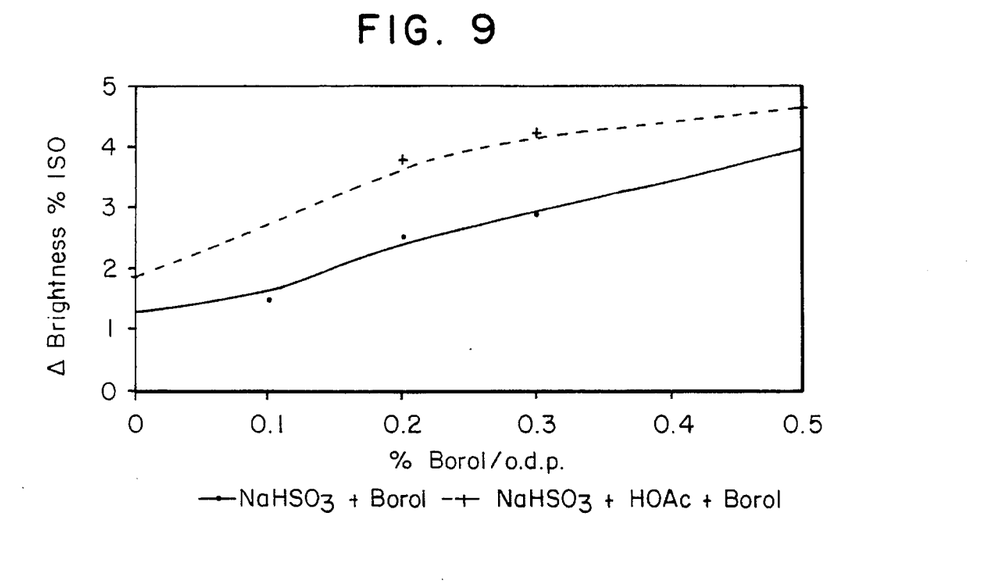
Figure 10:
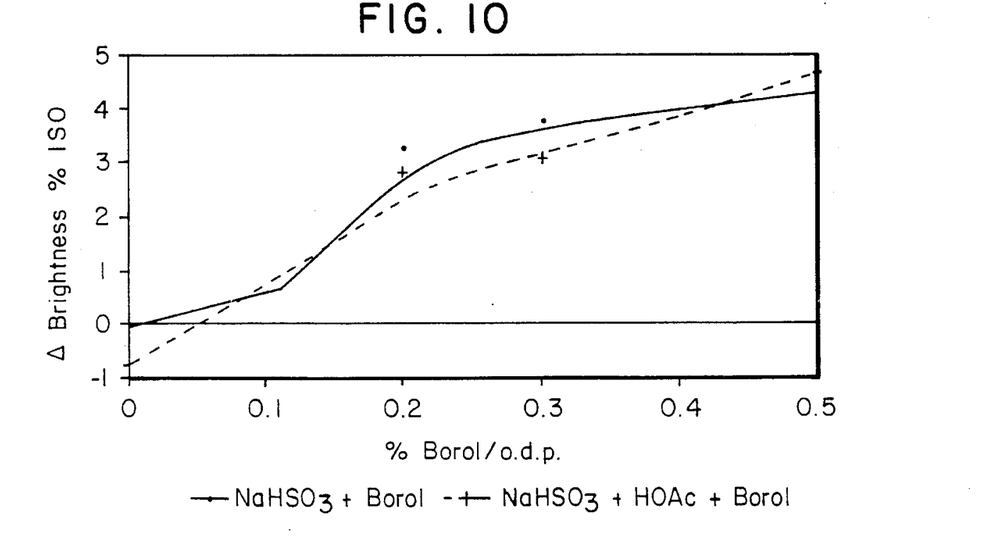

The results are compiled in Tables 10 to 12 and demonstrated in FIGS. 8 to 10.

The addition of 1.5% sodium bisulphite alone gave a moderate increase in brightness of 0.9 and 1.3 ISO points for the DIP 1 and 2. A direct injection of 0.5% Borol solution without bisulphite gave a brightness increase of 0.7 and 1.0 points respectively.

The combination of 1.5% sodium bisulphite and 0.5% Borol solution raised the brightness by 4% points. The combination of NaHSO₃ and the Borol solution indicates a synergistic effect on the brightness response. This effect can be seen in FIG. 10 very distinctly: the brightness response of 3.2 points can be achieved by adding 0.2% Borol solution and 1.5% bisulphite. In comparison with hydrosulphite, 0.75% active Na₂S₂O₄ is needed to obtain the same brightness response.

The addition of 0.15% acetic acid improves the bleaching effect of the DBI technique, especially for the bleaching of wood-containing ONP-DIP. FIGS. 8 and 9 show that a small amount of the acetic acid addition can reduce the chemical addition rate of the Borol solution, for example for DIP 2 from 0.5% to 0.3% for the achievement of 4 ISO brightness points. The effect of the addition of acetic acid to the DBI technique is not significant for the bleaching of the wood-free de-inked pulp. The optimum addition rate of acetic acid ranges between 0.15 and 0.2%.

TABLE 10

Bleaching results of DIP 1 with DBI

| N* | NaHSO$_3$ %/adp | HOAc %/adp | BOROL %/adp | pH start | pH final | BRIGHTN % ISO | Δ-BR. % ISO | YELLOW % | Δ-YELLOW % | Y-VALUE % | Δ-Y % | L | a | b |
|---|---|---|---|---|---|---|---|---|---|---|---|---|---|---|
| 1010 Blank | — | — | — | 7.22 | 7.12 | 64.36 | — | 11.94 | — | 70.63 | — | 87.31 | −1.3 | 6.6 |
| 1011 Ref | 1.5 | — | — | 6.57 | 5.59 | 65.22 | 0.86 | 10.99 | −1.05 | 71.02 | 0.39 | 87.50 | −1.4 | 6.2 |
| 1012 | 1.5 | — | 0.2 | 6.60 | 6.67 | 66.83 | 2.47 | 10.30 | −1.64 | 72.49 | 1.86 | 88.19 | −1.8 | 5.9 |
| 1013 | 1.5 | — | 0.1 | 6.50 | 6.61 | 65.77 | 1.41 | 10.69 | −1.25 | 71.51 | 0.88 | 87.75 | −1.6 | 6.1 |
| 1014 Ref | — | — | 0.5 | 7.68 | 7.58 | 65.02 | 0.66 | 11.72 | −0.22 | 71.01 | 0.38 | 87.60 | −1.2 | 6.4 |
| 1015 | 1.5 | — | 0.3 | 6.96 | 6.95 | 67.24 | 2.88 | 9.91 | −2.03 | 72.73 | 2.10 | 88.29 | −1.8 | 5.8 |
| 1016 | 1.5 | — | 0.5 | 6.95 | 7.05 | 68.32 | 3.96 | 9.11 | −2.83 | 73.40 | 2.77 | 88.61 | −1.8 | 5.3 |
| 1017 Blank | — | — | — | 7.22 | 7.17 | 64.14 | — | 12.28 | — | 70.57 | — | 87.28 | −1.3 | 6.7 |
| 1018 Ref | 1.5 | 0.15 | — | 6.70 | 6.47 | 65.45 | 1.31 | 10.90 | −1.04 | 71.24 | 0.61 | 87.60 | −1.4 | 6.1 |
| 1019 Ref | — | 0.15 | — | 7.05 | 6.80 | 64.85 | 0.71 | 11.66 | −0.28 | 71.02 | 0.39 | 87.50 | −1.3 | 6.4 |
| 1020 | 1.5 | 0.15 | 0.2 | 6.99 | 6.71 | 67.43 | 3.29 | 9.37 | −2.57 | 72.60 | 1.97 | 88.23 | −1.8 | 5.5 |
| 1021 | 1.5 | 0.15 | 0.3 | 7.10 | 6.80 | 67.56 | 3.42 | 9.28 | −2.66 | 72.69 | 2.06 | 88.28 | −1.8 | 5.4 |
| 1022 | 1.5 | 0.15 | 0.5 | 7.28 | 6.98 | 68.29 | 4.15 | 9.13 | −2.81 | 73.37 | 2.74 | 88.6 | −1.7 | 5.3 |
| 1030 Blank | — | — | — | 7.22 | 7.12 | 63.65 | — | 12.96 | — | 70.37 | — | 87.20 | −1.2 | 7.0 |
| 1027 | 1.5 | 0.15 | 0.4 | 6.92 | 6.87 | 67.08 | 3.43 | 9.92 | −3.04 | 72.52 | 2.15 | 88.21 | −1.7 | 5.7 |
| 1028 | 1.5 | 0.20 | 0.5 | 7.08 | 6.97 | 68.99 | 5.34 | 9.63 | −3.33 | 72.43 | 2.06 | 89.09 | −1.9 | 5.7 |

TABLE 11

Bleaching results of DIP 2 with DBI

| N* | NaHSO$_3$ %/adp | HOAc %/adp | BOROL %/adp | pH start | pH final | BRIGHTN % ISO | Δ-BR. % ISO | YELLOW % | Δ-YELLOW % | Y-VALUE % | Δ-Y % | L | a | b |
|---|---|---|---|---|---|---|---|---|---|---|---|---|---|---|
| 1140 Blank | — | — | — | 7.11 | 7.09 | 59.63 | — | 15.61 | — | 67.29 | — | 85.67 | −0.9 | 8.2 |
| 1141 Ref | 1.5 | — | — | 6.51 | 6.71 | 60.90 | 1.27 | 14.11 | −1.50 | 67.93 | 0.64 | 85.98 | −1.2 | 7.6 |
| 1142 Ref | — | — | 0.5 | 8.01 | 7.63 | 60.58 | 0.95 | 15.08 | −0.53 | 67.62 | 0.33 | 86.05 | −0.9 | 7.8 |
| 1143 | 1.5 | — | 0.1 | 6.95 | 6.76 | 61.11 | 1.48 | 14.14 | −2.00 | 68.23 | 0.94 | 86.13 | −1.2 | 7.5 |
| 1144 | 1.5 | — | 0.2 | 6.75 | 6.81 | 62.13 | 2.50 | 14.08 | −1.53 | 69.42 | 2.13 | 86.71 | −1.6 | 7.7 |
| 1145 | 1.5 | — | 0.3 | 6.80 | 6.94 | 62.49 | 2.86 | 13.56 | −2.05 | 69.56 | 2.27 | 86.75 | −1.6 | 7.5 |
| 1146 | 1.5 | — | 0.5 | 7.24 | 7.05 | 63.59 | 3.96 | 13.10 | −2.51 | 70.47 | 3.18 | 87.17 | −1.6 | 7.2 |
| 1147 Blank | — | — | — | 7.46 | 7.10 | 59.20 | — | 15.82 | — | 66.96 | — | 85.50 | −0.9 | 8.2 |
| 1148 Ref | 1.5 | 0.15 | — | 6.80 | 6.61 | 61.07 | 1.87 | 14.05 | −1.77 | 68.11 | 1.15 | 86.08 | −1.2 | 7.5 |
| 1149 Ref | — | 0.15 | — | 7.17 | 7.01 | 59.29 | 0.09 | 15.76 | −0.06 | 67.01 | 0.05 | 85.53 | −0.9 | 8.3 |
| 1151 | 1.5 | 0.15 | 0.2 | 7.07 | 6.73 | 62.95 | 3.75 | 13.39 | −2.43 | 69.96 | 3.00 | 86.96 | −1.6 | 7.4 |
| 1152 | 1.5 | 0.15 | 0.3 | 7.12 | 6.84 | 63.41 | 4.21 | 13.00 | −2.82 | 70.25 | 3.29 | 87.09 | −1.7 | 7.2 |
| 1153 | 1.5 | 0.15 | 0.5 | 7.27 | 7.04 | 63.86 | 4.66 | 12.21 | −3.61 | 70.38 | 3.42 | 86.87 | −1.6 | 6.9 |
| 1160 Blank | — | — | — | 7.44 | 7.51 | 59.13 | — | 16.23 | — | 67.05 | — | 85.53 | −0.8 | 8.5 |
| 1154 | 1.5 | 0.15 | 0.4 | 6.95 | 6.90 | 63.11 | 3.98 | 13.23 | −3.00 | 69.45 | 2.40 | 86.96 | −1.6 | 7.3 |
| 1155 | 1.5 | 0.20 | 0.5 | 7.05 | 6.99 | 63.15 | 4.02 | 13.06 | −3.17 | 69.97 | 2.92 | 86.98 | −1.6 | 7.2 |
| 1159 | 1.5 | — | 0.4 | 7.18 | 7.12 | 63.20 | 4.07 | 13.24 | −2.99 | 70.14 | 3.09 | 86.78 | −1.5 | 7.9 |

What is claimed is:

1. A multi stage process for bleaching de-inked paper pulp which comprises:
   treating the pulp sequentially,
   (1) by adding and mixing sodium bisulfite to said pulp to cause bleaching of the said pulp in a first stage,
   (2) bleaching said pulp in a second stage with sodium dithionite by adding sodium borohydride which reacts with unreacted residual sodium borohydride from the first stage to form sodium dithionite generated in situ, and
   (3) bleaching said pulp in a third stage with unreacted sodium borohydride added in said second stage, wherein said borohydride is added in stage (2) after a time interval of at least 2 minutes from the termination of the mixing of the sodium bisulfite addition of stage (1).

2. A process according to claim 1 wherein the sodium borohydride is added in an aqueous mixture with sodium hydroxide.

3. A process according to claim 2 wherein the said aqueous mixture comprises 10 to 25 wt % NaBH$_4$, 15 to 50 wt % NaOH and the balance essentially water.

4. A process according to claim 1 wherein the total concentration of NaBH$_4$ added is 0.01 to 0.1 wt %, based on oven-dried pulp.

5. A process according to claim 4 wherein the total concentration of sodium borohydride is 0.024 to 0.048 wt % based on oven-dried pulp.

6. A process according to claim 1 wherein the total concentration of sodium bisulfite added is 0.5 to 2.5 wt % based on oven-dried pulp.

7. A process according to claim 1 wherein a weak acid is added to the pulp.

8. A process according to claim 7 wherein the weak acid is added after the sodium bisulfite and before the sodium borohydride.

9. A process according to claim 7 wherein the weak acid comprises acetic, formic, citric or oxalic acid.

10. A process according to claim 9 wherein acetic acid is added to the pulp in an amount of 0.1 to 0.2 wt % based on oven-dried pulp.

11. A process according to claim 1 which is carried out as the pulp passed through a pipe.

12. A multi-stage bleaching sequence as described in claim 1 wherein the sodium borohydride is added in said second stage after a five minute interval following the addition and mixing of sodium bisulfite in said first stage.

13. A multi-stage bleaching sequence as described in claim 1 wherein the sodium borohydride is added in stage (2) after an interval of from 2 to 5 minutes following the addition of mixing of sodium bisulfite in stage (1).

* * * * *

UNITED STATES PATENT AND TRADEMARK OFFICE
CERTIFICATE OF CORRECTION

PATENT NO. : 5,562,803
DATED : 8 October 1996
INVENTOR(S) : David L.K. Wang and Patrick Meyers It is certified that error appears in the above-indentified patent and that said Letters Patent is hereby corrected as shown below:

At column 3, third line from the bottom (unnumbered), "Just" should be --just--.

At column 13, line 62, "sodium borohydride" should be --sodium bisulfite--.

Signed and Sealed this

Eleventh Day of March, 1997

Attest:

BRUCE LEHMAN

Attesting Officer     Commissioner of Patents and Trademarks